United States Patent [19]
Apsit et al.

[11] 3,940,668
[45] Feb. 24, 1976

[54] DUAL DUTY DRIVE WITH INDUCTION MOTOR

[76] Inventors: Voldemar Voldemarovich Apsit, ulitsa V. Latsisa, 2a, kv. 21; Alexei Petrovich Ustinsky, ulitsa Marupes, 33, kv. 29; Vladislav Alexandrovich Pugachev, ulitsa Moskovskaya 266, korpus 5, kv. 73; Mikhail Maiorovich Usachev, ulitsa Suvorova 70, kv. 5, all of Riga, U.S.S.R.

[22] Filed: Aug. 16, 1973

[21] Appl. No.: 388,915

[52] U.S. Cl. .................................. 318/226; 310/99
[51] Int. Cl.² ...................................... H02P 1/32
[58] Field of Search ....... 318/225, 226; 310/99, 100

[56] References Cited
UNITED STATES PATENTS

| | | |
|---|---|---|
| 2,317,266 | 4/1943 | Galt, Jr. ............................. 318/226 |
| 2,549,896 | 4/1951 | Dunham .......................... 310/99 X |
| 2,867,127 | 1/1959 | Fehr.................................... 310/99 |
| 2,912,607 | 11/1959 | Duncan............................... 310/99 |
| 3,026,460 | 3/1962 | Fath................................... 318/226 |
| 3,171,995 | 3/1965 | Ponsy............................... 310/99 X |

Primary Examiner—G. Z. Rubinson
Attorney, Agent, or Firm—Haseltine, Lake & Waters

[57] ABSTRACT

A dual duty drive for an actuating mechanism, for example a pump or a fan, incorporating an induction motor and an electromechanical reduction gear unit. The economical and reliable operation in the rated duty is ensured by delta connecting the motor windings, and with current being applied across the field winding of the electro-mechanical reduction gear unit, the latter is caused to operate with a gear ratio close to unity. Under a fractional load duty, the motor windings are star connected and the electro-mechanical reduction gear unit is deenergized, causing the latter to operate in the step-down reduction mode.

3 Claims, 7 Drawing Figures

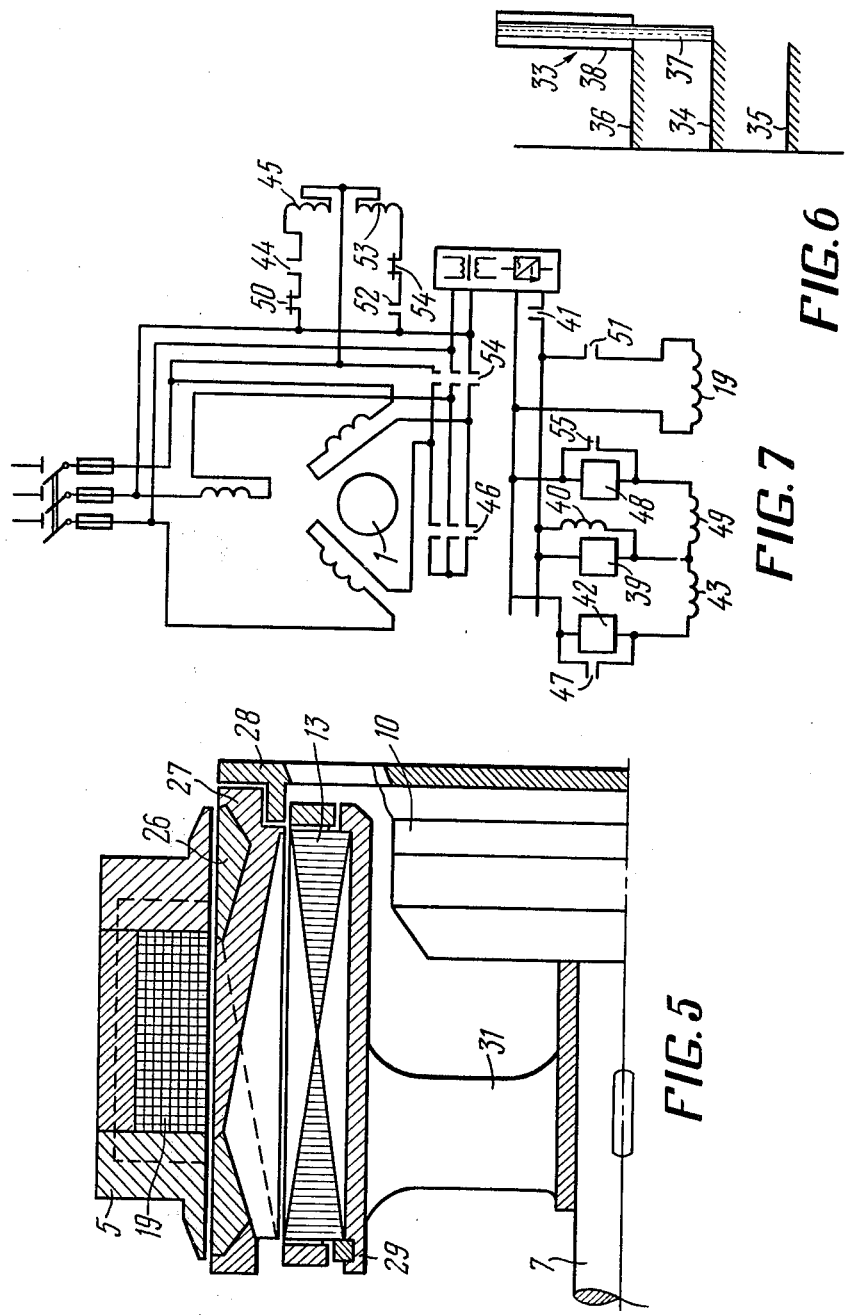

DUAL DUTY DRIVE WITH INDUCTION MOTOR

The present invention relates to the electric drives of actuating mechanisms, and more particularly to dual duty controlled drives with induction motors for actuating pumps, air blast blowers, compressors and the like machinery.

The prior art controlled drives with induction motors are negatively characterized by their low operating economy and service reliability. Thus, for example, these drives exhibit the following disadvantages:

High starting current ratios which exceed their rated values by a factor of 4 to 7, which fact calls for the provision of a substantial idle capacity of the power sources intended to supply these motors, resulting in a tangible increase of costs and materials, especially in case of self-contained power sources used where power transmission lines are not available.

Low load capacity of currently used squirrel cage motors, resulting from their poor starting characteristic, when in order to ensure their reliable starting the load moment of these motors is selected to be scorefold lower relative to the moment developed by these motors under rated operating conditions.

The situation entails motor overrating, increase of its starting currents and the idle power capacity of the supply line, as well as reduced power factor of the line.

More often than not the electric drives of the actuating mechanisms are not controlled, the controlled elements being various directing means, such as gates and throttles, serving for controlling gas and liquid flows, thus involving substantial waste of energy. In a number of cases control is effected by intermittently switching the drive on and off, which calls for repeated switching of the total power supplied to the drive. Generally, such mode of control results in a low factor of merit exhibited by the system, fails to satisfy process control requirements and calls for expensive auxiliary equipment.

Thus, for example, the problem of water removal from polders, that is from drainage systems erected on agricultural land located on low-level swampland or on located below the sea level, presents considerable difficulties. Such areas are generally highly fertile, thus being a substantial reserve for the production of agricultural produce.

Power supply of polders usually involves long power transmission lines and transformer substations. Frequent switching of pump drives resulting from a limited inflow into the forebay entails the failure of power supply systems and motors owing to frequent application of heavy starting currents. One of the methods currently used in order to decrease the number of switching involves water recirculation, whereby a portion of removed water is pumped back into the forebay.

Similar measures have to be taken for controlling the operation of other above-mentioned mechanisms with the resulting considerable waste of electric energy and excessive installed capacity of power supply systems and drives.

Accordingly, the object of the present invention is to eliminate the above disadvantages and provide a hightly effective dual duty drive with an induction motor.

Another object of the present invention is to provide a highly reliable drive with an asynchronous motor, permitting inexpensive means for controlling its modes of operation in accordance with the requirements of a given technological process employing said drive.

Yet another object of the present invention is to provide a dual duty drive with an easily started squirrel cage induction motor, increase efficiency of the drive and the power factor of the supply mains, as well as reduce the number of required switchings.

A further object of the present invention is to provide a drive having smoothly variable operating modes, together with the corresponding actuating mechanisms.

An additional object of the present invention is to provide a dual duty drive distinguished by small overall dimensions and light weight, which is easy and cheap to manufacture.

These and other objects are attained in a dual duty drive with an induction motor, having a means for switching the motor windings from star to delta connection and a reduction gear unit disposed intermediate of said drive and the actuating mechanism, wherein, according to the invention, said reduction gear unit is adapted to operate both with a preset step-down gear ratio and with a gear ratio equal to or approaching unity, and a selector switch electrically coupled to the motor and the reduction gear unit, said selector switch having different operating positions, whereby in one position the windings of the induction motor are star connected and the reduction gear unit is caused to operate in the step-down mode, whereas in the other position the motor windings are delta connected and the reduction gear unit is shifted to operate with a gear ratio equal to or approaching unity.

These novel features of the drive according to the invention permit the capacity of the power source required for starting the motor to be reduced and the number of switchings for changing the operating mode of the drive to be brought to the minimum.

In accordance with one of the embodiments of the invention use is made of a reduction gear unit which includes an electromagnetic clutch incorporating an armature and an inductor, a controllable field winding, a single-stage mechanical differential ensuring a preset step-down gear ratio in response to the decoupling of the clutch armature and inductor, and an overrunning means which, in response to the application of current across the field winding to initiate electromagnetic coupling of the clutch armature and inductor, permits a gear ratio equal to or approaching unity to be obtained.

The above construction of the reduction gear unit ensures a reliable and quick response of the drive, while being relatively inexpensive and having a simple design and small overall dimensions.

Moreover, the present invention incorporates a switching means which is essentially composed of two contactors, one contactor being intended for ensuring a delta connection of the motor and energizing the field winding of the reduction gear unit, whereas the other contactor is adapted to switch the motor to a star connection, while breaking said first contactor.

The above switching means allows quick and convenient switching of the drive from the nominal to heavy duty and vice versa.

A fuller understanding of the nature and objects of the invention will be had from the following detailed description of an embodiment thereof, taken in conjunction with the accompanying drawings, in which:

FIG. 5 is a portion of the electromagnetic reduction gear shown in FIG. 2;

FIG. 6 is a diagram for measuring the level of liquid for the purpose of controlling the performance of the drive shown in FIG. 1;

FIG. 7 is the switching circuit diagram of a dual duty drive with the induction motor shown in FIG. 1, according to the invention.

Figure 1:
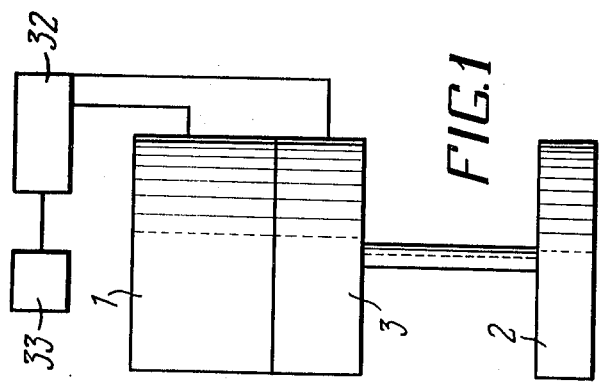
FIG. 1 illustrates a general block diagram of a dual duty drive according to the invention, in conjunction with the actuating and controlling devices.

A dual duty drive according to the invention includes a squirrel-cage induction motor 1 (FIG. 1), the motor windings being adapted to be switched from star to delta connection and vice versa. An actuating mechanism 2 is coupled to the motor 1 via an intermediate reduction gear unit 3, adapted to operate both with a step-down gear ratio, and with a gear ratio equal to or approaching unity.

The intermediate roduction gear unit 3 may be embodied according to any known design, provided it satisfies the above-mentioned requirement. It is expedient to embody the unit 3 as an electromagnetic reduction gear unit of a design discussed hereinbelow.

Figure 4:
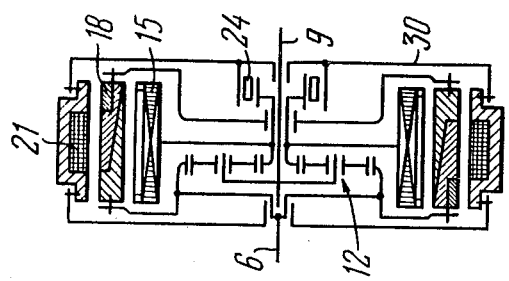
FIGS. 2, 3 and 4 are gear train diagrams of three modifications, respectively, of an electromagnetic reduction gear unit in the drive shown in FIG. 1.
Figure 3:
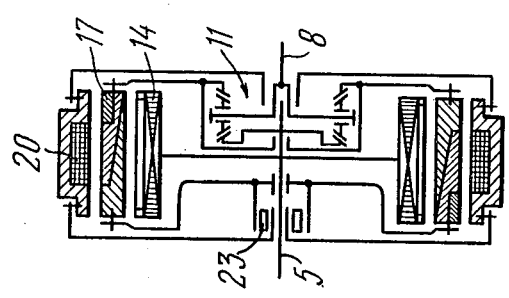
Figure 2:
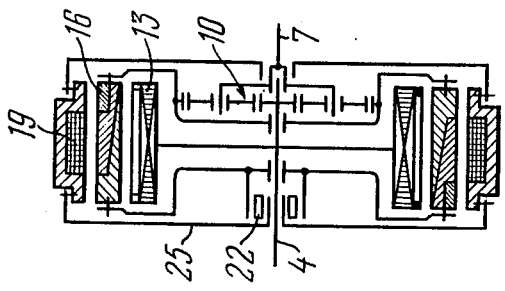

The reduction gear unit incorporated in the present embodiment of the drive may be manufactured in three modifications (FIGS. 2, 3, 4), which are, nevertheless, comprised of identical components indicated below for each modification respectively.

These are an input (4, 5, 6) and an output (7, 8, 9) shafts; a mechanical single-stage differential (10, 11, 12) with a preset gear ratio, an electromagnetic clutch comprising an armature (13, 14, 15), and an inductor (16, 17, 18). There is also a field winding (19, 20, 21) controlling the electric coupling between the clutch armature and the inductor, and an overrunning means (22, 23, 24).

The reduction gear unit is intended for ensuring a stepless or stepwise changing of angular speed ($\omega$) at the output, with the input angular speed being constant, or vice versa.

The electromagnetic reduction gear unit is essentially a kinematically closed electromechanical device built on the basis of a sliding or friction type clutch, incorporating a mechanical single-stage differential and an overrunning means.

The electromagnetic reduction gear unit is manufactured in three modifications (FIGS. 2, 3, 4), depending on the required range (q) of angular speed variation, which is equal to the ratio of $\omega_{max}$ at the output to $\omega_{min}$ at the output.

In the case of the first modification (FIG. 2), it may be assumed that $q = 8.0-2.6$;

the assumed value of q for the second modification (FIG. 3) is $q=2$;

for the third modification (FIG. 4), $q=1.8-1.14$.

The different value of q in the above modifications is due to different kinematic coupling between the moving members of the mechanical differential and the members of the electromagnetic clutch, as well as to the location of the overrunning means.

The family of electromagnetic reduction gear units built around a sliding electromagnetic clutch may incorporate a universal contactless magnetic system, comprising: - ring-type field winding 19 (FIGs. 2 and 5), disposed in a housing 25 of the device; a pole holder having beark-shaped poles (26) of different polarity embedded in a diamagnetic alloy 27 and connected with one of the wheels of the mechanical differential 10. There are also two pole holder caps with bearings, with the case of mechanical differential 10 being secured to one of the caps 28; an aramture 13 of a single-would or solid type, connected to another central wheel of the differential 10.

The pole holder caps 28 are manufactured of a diamagnetic material permitting the magnetic flux dissipation to be substantially reduced, thus reducing the excitation power.

A carrier 29 of the differential 10 is rigidly coupled to the output shaft 7.

With the driving input shaft 4 (FIG. 2) being connected to the armature 13, the overrunning means 22 is mounted intermediate of the pole holder 26 (the cap thereof) and the housing 25, whereas with the shaft 6 (FIG. 4) being connected to the pole holder of inductor 18, it is mounted intermediate of the armature 15 (the shaft thereof) and a housing 30. In case of a design involving a bevel-gear differential 11 (FIG. 3), the manner in which the wheels of the differential engage the clutch members is immaterial.

Thus, in all design versions, the driven member of the clutch plays the part of the end member, connected with the overrunning means, the differential case serving as one of its wheels, while the profiled spokes 31 (FIG. 5) of the armature serve as fan blades.

The overrunning means is mounted in a manner permitting the driven member of the clutch to rotate only in the sense of rotation of the driving member, connected to the input shaft. All design modifications discussed above are subject to the same energo-kinematic regularities.

A comparison made between the design electromagnetic moment of the clutch incorporated in the electromagnetic reduction gear unit ($M_{em}$) and the moment at the output of the reduction gear unit ($M_o$) proves the ratio to be less than unity by $1/q$.

The above ratio serves to prove that a reduced control range tends to substantially reduce the design electromagnetic moment and consequently is conductive to the reduction of overall dimensions and weight characteristics of the construction.

Conversely, with the same design features of the magnetic circuit, the load capacity of the electromagnetic reduction gear unit will increase 1.4 to 8.0 times with a decreased differential owing to a change of the differential gear ratio and of its connection diagram.

The electromagnetic reduction gear unit operates as follows.

In the absence of excitation, a moment is applied to the end member of the clutch via one of the central (bevel) gears of the differential, the moment tending to turn the member in a direction opposite to the sense of rotation of the driving member.

The end member will thus be caused to thrust against the housing by means of the overrunning means with the result that the electromagnetic reduction gear unit will start to operate as a planetary reduction gear with a preset gear ratio $i_r$ (stepdown mode).

With the rated voltage applied across the field winding of the electromagnetic reduction gear unit, the electromagnetic interaction between the driving and the end members will cause the latter to rotate, the sense and speed of rotation being similar to those of the driving member, thus ensuring in this mode of the reduction gear operation a gear ratio which is equal to or approaching unity.

With the excitation voltage removed, the drive starts operating in the reduction duty, hence the range of angular speed variation will always be close to the gear ratio of the differential operating in the planetary duty.

The contactless design of the sliding clutch incorporated in the electromagnetic reduction gear unit ensures high reliability of the construction and a smooth change of the operating duty both of the reduction gear unit and the mechanisms coupled to it.

With full excitation current being applied across the electromagnetic reduction gear unit, the latter starts operating with a gear ratio approaching unity, i.e. such reduction gear unit has two highly stable operating duties. Consequently, the control range (8) of the reduction gear unit $$q = \frac{i_r}{i_e} = i_e; \qquad (1)$$

where $i_e$ is gear ratio in the excited state; $i_r$ is gear ratio when operating in the reduction duty. Since the ratio of moments at the output ($M_{out}$) and the input ($M_{in}$) of the unit operating in the reduction duty is $$\frac{M_{in}}{M_{out}} = \frac{1}{i_r} \qquad (2)$$

the motor will be subjected to the action of a moment which is $i_r$ times less than the moment of the actuating mechanism being controlled.

If the moment of the controlled actuating mechanism is constant in the function of changing the speed of rotation, the ratio of the input moments, in other words the moments applied to the motor from the side of the actuating mechanism in the reduction ($M_{in,r}$) and the excited ($M_{in,e}$) duties will assume the following form:

$$\frac{M_{in,r}}{M_{in,e}} = \frac{1}{i_r} \qquad (3)$$

On the other hand, with the moment of the actuating mechanism not being constant in the function of the speed of rotation, the regularities governing its variation should be taken into consideration when carrying out similar comparison.

It will be easily appreciated that the ventilator characteristic of the actuating mechanism moment variation in shifting the drive from one operating duty to the other is responsible for the relationship $$\frac{M_{in,r}}{M_{in,e}} = \frac{1}{\sqrt{i_r}} \qquad (4)$$

For the sake of simplicity the above relationships do not take into account the efficiency of the electromagnetic reduction gear unit, which in the both static duties presented above reaches 93–96%.

In starting an induction motor the ratio of its line currents when star connected, $I_{s.line,Y}$ and delta connected $I_{s.line,\Delta}$, is known to be $$\frac{I_Y}{I_\Delta} = \frac{1}{3} \qquad (5)$$

Since the motor efficiency and especially the network power factor will be lower at small loads when the stator windings are star connected rather than delta connected, the starting duty is facilitated, the drive operating costs are reduced and the power factor of the network improved under fractional load conditions by presetting the gear ratio of the reduction gear operating in the reduction duty in accordance with the ratio between the motor starting currents. For example, for the cases under consideration 3 ) and (4), the respective gear ratios of the reduction gear unit may be obtained from the relationships:

$$\frac{1}{i_r} = \frac{M_{in,r}}{M_{in,e}} = \frac{I_Y}{I} = \frac{1}{3} \qquad (6)$$

$$\frac{1}{\sqrt{i_r}} = \frac{M_{in,r}}{M_{in,e}} = \frac{I_Y}{I_\Delta} = \frac{1}{3} \qquad (7)$$

With these conditions satisfied, the motor starting currents may be reduced three-fold, inasmuch as in this case the motor is switched from the star to delta connection at the rated speed of rotor rotation; it also permits a two-position control of the motor, thus ensuring better maintenance of controlled process variables with a simultaneous reduction of the number of switching of the motor duties.

Such approach to the problem permits the above-mentioned advantages to be implemented, as well as the load capacity of common induction motors to be increased as much as 1.5 times.

In this case the step-down gear ratio $i_r$ in the cases just considered must be determined from relationships (8) and (9), rather than from relationships (6) and (7):

$$\frac{1}{i_r} = \frac{M_{in,r}}{M_{in,e}} = \frac{1}{3 \times 1.5} \qquad (8)$$

$$\frac{1}{\sqrt{i_r}} = \frac{M_{in,r}}{M_{in,e}} = \frac{1}{3 \times 1.5} \qquad (9)$$

The 1.5 fold increase of the effective resistance moment permits the motor to be started and operated in the star mode with the nominal moment ($M_1$), and in the delta mode, with the moment $M_2 = 1.5 M_1$.

In this case, the motor and the network will have better energy indices (power consumption, starting currents, network power factor, etc.) permitting a substantial reduction of installed power of self-contained power sources and a considerable improvement of the drive specifications.

Discussed below is an embodiment of the drive according to the invention, in conjunction with an actuating mechanism performing a definite purpose, comprising:

a squirrel cage induction motor 1 (FIG. 1),
an electromagnetic reduction gear unit 3,
an actuating mechanism 2,
a means 32 for automatic switching of the drive, and sensor 33 of a permissible range for the controlled variable.

It will be appreciated that in contrast to a common single duty drive which in carrying out process control is generally switched in response to signals derived from two sensors, corresponding to the upper and lower permissible limits of the controlled variable, the drive according to the present invention must derive an additional signal corresponding to a certain intermediate (starting) value of the controlled variable. In this case, the drive operation, for example involving water level control in the polder forebay, can be reduced to the following.

With the level of water in the forebay rising to the starting level (FIG. 6), the drive is energized to operate in the fractional load duty. With the water inflow into the forebay being not very intensive, the drive will operate in the above duty until the water level drops to the lower level 35, whereat the motor tripping signal is initiated.

If the water inflow into the forebay is very intensive and the pump delivery when operating in this mode is not sufficient, the sensor disposed on the upper level 36 will initiate a signal to switch the motor to its rated duty, whereat the latter will operate until the water level drops to the preset lower level.

Taking into consideration that intensive water inflow will generally take place only during the rain season and while the snow is melting, more often than not the drive will operate in the fractional load duty rather than in the rated duty.

A prior art capacity sensor comprising a rod 37 and a pipe 38 may be used as a sensor for the upper 36 and lower 37 level indication. The capacitive reactance taking place between the rod and the pipe will discretely vary in response to a contact occuring between the butt face of rod 37 and water, as well as between the end of pipe 38 and water, thus ensuring the initiation of a signal for switching the drive as the water level reaches the upper 36 and the lower 34 levels. In this case, the distance between the levels is preset by changing the length of the metal rod 37. FIG. 7 illustrates a general circuit diagram for switching the drive of said actuating mechanisms.

As soon as the controlled variable reaches one of the limiting levels, the first sensor 39 will automatically send a signal to energize the winding of relay 40, causing it to close its contact 41, thus switching the system to operate in the other duty. Once the controlled variable reaches its starting level, the sensor 42 will automatically energize the relay 43, its contact 44 closing to switch on the contactor 45. The contactor 45 will effect star connection of the induction motor 1 by means of its power contacts 46, while its auxiliary contacts 47 will shunt the automatic means of sensor 42. In this case, the drive will operate in a highly economical fractional load duty. If the variation of the controlled variable is not very intensive, the drive, operating in this duty, will ensure proper maintenance of the controlled variable at a certain steady level; with the level changing to the original value, the sensor 39 will automatically energize the relay 40 thus rendering operative the whole system of drive supply. If the rate of change experienced by the controlled variable is very intensive and under the circumstances the drive fails to ensure stabilization of the controlled variable, and it reaches the position corresponding to the third sensor position, the sensor automatic means 48 will energize the relay 49 causing the latter to open its contact 50, thus tripping the induction motor 1, close its contact 51 to apply current to the field winding 19 of the reduction gear unit clutch, and close its contact 52 to prepare the supply circuit of the contactor 53 winding.

Once the contactor 45 is tripped, its auxiliary contact 54 is caused to close to energize the contactor 53. The power contacts 54 of contactor 53 will switch the motor 1 to delta connection, while its auxiliary contacts 55 will shunt the automatic means of sensor 48. All this ensures the drive operation in the highly economical rated duty until the automatic means of sensor 42 initiates a signal to drip the system.

Thus, the drive according to the present invention ensures easy starting of the motor, improves the drive and network efficiency and reduces the number of switchings due to the drive operating in the fractional load duty for a longer period of time.

What we claim is:

1. A dual duty drive with an induction motor having a means for switching the windings there of from star to delta connection and vice versa, also comprising a reduction gear unit disposed at the output of said induction motor and intended for transmitting power to a controlled actuating mechanism, said reduction gear unit being adapted to operate both with a present step-down gear ratio and with a gear ratio equal to or approaching unity; a control means, operatively connected to said means for switching the windings of the induction motor and to said reduction gear unit, said control means having different operating positions, whereby in one position the windings of the induction motor are star connected and the reduction gear unit is caused to operate with a step-down gear ratio, whereas in the other position the induction motor windings are delta connected and the reduction gear unit is shifted to operate with a gear ratio equal to or approaching unity.

2. A dual duty drive as claimed in claim 1, comprising a reduction gear unit including an electromagnetic clutch incorporating an armature and inductor, said electromagnetic clutch being operable by means of a field winding, a singlestage mechanical differential ensuring a preset step-down gear ratio in response to the decoupling of said clutch armature and inductor, an overrunning means which, in response to the application of current across the field winding to initiate electromagnetic coupling of the clutch armature and inductor, permits a gear ratio equal to or approaching unity to be obtained.

3. A dual duty drive as claimed in claim 2, wherein the control means is essentially composed of two contactors, one of the contactors effecting delta connection of said induction motor and applying current across the field winding of said reduction gear unit, whereas the other contactor is adapted to switch the motor to star connection while breaking said first contactor.

* * * * *